United States Patent [19]

Shimada et al.

[11] Patent Number: 5,030,322

[45] Date of Patent: Jul. 9, 1991

[54] METHOD OF FORMING ORIENTATION FILM OF LIQUID-CRYSTAL DISPLAY DEVICE

[75] Inventors: Shinji Shimada, Kashihara; Eiichi Takahashi; Kiyoshi Toda, both of Tenri, all of Japan

[73] Assignee: Sharp Kabushiki Kaisha, Osaka, Japan

[21] Appl. No.: 568,943

[22] Filed: Aug. 17, 1990

[30] Foreign Application Priority Data

Aug. 28, 1989 [JP] Japan .................. 1-221040

[51] Int. Cl.⁵ .................. B44C 1/22; B29C 37/00; C03C 15/00; C03C 25/06
[52] U.S. Cl. .................. 156/655; 156/643; 156/646; 156/657; 156/667; 156/345; 156/668; 204/192.3; 204/192.36; 204/192.37
[58] Field of Search ............ 156/655, 643, 646, 659.1, 156/657, 667, 668, 345; 204/192.3, 192.36, 192.37; 427/38, 39; 350/330, 339 R, 341, 351

[56] References Cited

U.S. PATENT DOCUMENTS 4,149,885 4/1979 Luo et al. .................. 156/656 X
4,452,826 6/1984 Shields et al. .................. 156/648 X

FOREIGN PATENT DOCUMENTS 52-15343 2/1977 Japan .
53-33641 3/1978 Japan .

*Primary Examiner*—William A. Powell
*Attorney, Agent, or Firm*—David G. Conlin; Gregory D. Williams

[57] ABSTRACT

A method of forming an orientation film of a liquid-crystal display device having two electrode plates and a liquid-crystal cell between the two electrode plates includes the steps of forming an organic film on a partial or overall surface of at least one plate of the two electrode plates and radiating accelerated ions containing neutral atoms to the partial or overall surface of the organic film coated on the plate. The organic film consists of liquid-crystal molecules. The radiation is done for etching the organic film and orienting the liquid-crystal molecules in a unidirectional manner. The angle of incidence of the accelerated ions is defined as 40° to 80° with respect to a normal line of the plate. It results in offering even orientation of liquid-crystal molecules included in the liquid-crystal display device.

11 Claims, 7 Drawing Sheets

Fig. 1

| ANGLE OF INCIDENCE (°) | RADIATION TIME (sec) | ORIENTATION EVENNESS |
|---|---|---|
| 50 | 25 | × |
| 60 | 10 | △ |
| 60 | 20 | ○ |
| 60 | 30 | △ |
| 70 | 25 | △ |
| 80 | 180 | × |

○ : PARTIALLY UNEVEN

△ : PARTIALLY ORIENTED

× : NOT ORIENTED

Fig. 4

| ANGLE OF INCIDENCE (°) | RADIATION TIME (sec) | ORIENTATION EVENNESS | PRE-TILT ANGLE (°) | VOLTAGE RETENTION(%) | VOFFSET (V) |
|---|---|---|---|---|---|
| 50 | 10 | ◎ | 1.0 | 96.6 | 0.35 |
| 50 | 20 | ◎ | 0.8 | 95.1 | 0.30 |
| 60 | 5  | ◎ | 0.8 | 96.0 | 1.80 |
| 60 | 10 | ◎ | 0.8 | 97.9 | 0.65 |
| 60 | 20 | ◎ | 0.5 | 97.5 | 0.30 |
| 60 | 30 | ◎ | 0.5 | 96.4 | 0.25 |
| 70 | 10 | ◎ | 0.5 | 96.9 | 0.80 |
| 70 | 20 | ◎ | 0.5 | 98.3 | 0.35 |

[◎: COMPLETELY EVEN ORIENTATION]

Fig. 6

| ANGLE OF INCIDENCE (°) | RADIATION TIME (sec) | ORIENTATION EVENNESS | PRE-TILT ANGLE (°) | VOLTAGE RETENTION(%) |
|---|---|---|---|---|
| 50 | 10 | ◎ | 1.0 | 96.6 |
| 50 | 20 | ◎ | 0.8 | 95.1 |
| 60 | 5 | ◎ | 0.8 | 96.0 |
| 60 | 10 | ◎ | 0.8 | 97.9 |
| 60 | 20 | ◎ | 0.8 | 97.5 |
| 60 | 30 | ◎ | 0.5 | 96.4 |
| 70 | 10 | ◎ | 0.5 | 96.9 |
| 70 | 20 | ◎ | 0.5 | 98.3 |
| 80 | 10 | ◎ | 0.4 | 98.0 |

METHOD OF FORMING ORIENTATION FILM OF LIQUID-CRYSTAL DISPLAY DEVICE

BACKGROUND OF THE INVENTION

1. Field of the Invention

The present invention relates to a method of forming an orientation film of a liquid-crystal display device and more particularly to a method for forming a film consisting of liquid-crystal molecules oriented in a horizontal and unidirectional manner.

2. Description of the Related Art

A normal liquid-crystal display device is designed to provide liquid crystal between transparent electrodes consisting of glass plates opposite to each other. By applying an electric signal between these electrodes, the display device is capable of modulating an incident ray from the outside and displaying information. For obtaining a feasible contrast, it is necessary to uniformly control the orientation of liquid-crystal molecules. In particular, for a liquid-crystal display device employing a field-effect system such as a nematic system, which is designed to twist the liquid-crystal molecules by about 90° to 360° between the upper and the lower cells, it is preferable to orient the liquidcrystal molecules in a horizontal and unidirectional manner in light of the principle of operation.

As a method for forming a film consisting of liquid-crystal molecules oriented in a horizontal and unidirectional manner, in general, there has been employed a rubbing method or an oblique evaporation method. The former method includes the steps of forming on an electrode plate an orientation film consisting of silicon oxide or polyimide, for example, applying sintering treatment on the electrode plate having the film formed thereon if necessary, and abrading the electrode plate in a unidirectional manner with a gigged or flocked cloth. The latter method includes the steps of vacuumvaporizing silicon oxide on the electrode plate in an oblique manner and growing the vaporized silicon oxide to be a vaporized film in a specific direction. These methods can offer great restriction for orientation to the liquid-crystal molecules so that they allow the liquid-crystal molecules to be stably oriented for a long period. Hence, they are widely employed as a method for treating orientation of the liquidcrystal molecules. In addition to the foregoing methods, there has been employed another method including the steps of forming a film consisting of silicon oxide on an electrode plate and radiating grains like ions in an electrically accelerating manner for making the silicon-oxide film served as the orientation film.

The foregoing rubbing method and oblique vaporization method, however, have the following shortcomings.

According to the rubbing method, the rubbing pressure is unevenly applied to a large electrode plate because the plate has an uneven surface and a heterogeneous thickness. The unevenly applied pressure results in unevenly orienting the liquid-crystal molecules, that is, being unable to realize high-precision display. And, as the electrode plate is abraded with the rubbing cloth, fibers and impurities contained in the cloth are attached on the orientation film, thereby degrading the characteristic of the display. It is thus indispensable to clean the liquid-crystal display, resulting in necessitating a large quantity of cleaning solvent. Moreover, in the liquid-crystal display containing a nonlinear element array such as a TFT (thin film transistor) or a MIM (metal-insulating layer-metal) element, the static electricity caused when abrading the treated electrode plate may break down a semiconductor switching element.

According to the oblique evaporation method, the crystals of silicon oxide attached on the electrode plate are expanded in a fanlike manner. It results in disadvantageously being unable to restrict the orientation direction of the liquid-crystal molecules to be unidirectional as well as unevenly orienting the molecules because of the flakes caused by the fanlike expansion of the crystals.

Lastly, consider the foregoing third method, that is, an orientation film forming method designed to radiate grains such as ions on the electrode plate having a silicon oxide film formed thereon in an electrically accelerating manner. FIG. 1 shows the characteristics of an orientation film formed to have a thickness of 1000Å with a normal sputtering method. As shown in FIG. 1, this method offers incomplete orientation of a film, so that it cannot realize characteristics sufficiently meeting the operation of the liquid-crystal display device.

SUMMARY OF THE INVENTION

It is therefore an object of the present invention to provide a method of forming an orientation film of a liquid-crystal display device which is capable of positively and evenly orienting liquid-crystal molecules in a unidirectional manner.

The object of the invention can be achieved by a method of forming an orientation film of a liquid-crystal display device including the steps of forming a polyimide film on an electrode plate and etching the electrode plate by radiating ions containing accelerated neutral atoms to it for transforming the polyimide film onto an orientation film, whereby a radiation angle of ions radiated to the polyimide film is defined as 40° to 80° with respect to a normal line of the electrode plate.

The foregoing orientation film forming method makes it possible to stably orient liquid-crystal molecules with no adverse effect given by the uneven thickness or surface of the electrode plate, thereby realizing a high-precision and liquid-crystal display device with large area for a display. Further, since the method employs a non-contact type orienting treatment method, no dirt is applied on the orientation film surface. Hence, no cleaning is required after the orienting treatment.

The method of forming an orientation film of a liquid-crystal display device can offer a high-precision liquid-crystal display if it may employ a simple matrix or an active matrix system. And, the method requires only one material, gas, for the orienting treatment, thereby reducing the production cost and bringing about no dirts contaminating the steps.

Further objects and advantages of the present invention will be apparent from the following description of the preferred embodiments of the invention as illustrated in the accompanying drawings.

BRIEF DESCRIPTION OF THE DRAWINGS

FIG. 1 is a table indicating the characteristics of an orientation film formed to have a 1000Å thickness by a normal sputtering method;

FIG. 4 is a table showing the characteristics of a liquid-crystal cell obtained according to the first embodiment of the invention;

FIG. 6 is a table showing the characteristics of a liquid-crystal cell obtained according to the second embodiment of the invention;

DESCRIPTION OF THE PREFERRED EMBODIMENTS

A first embodiment of the present invention is shown below.

Figure 2:
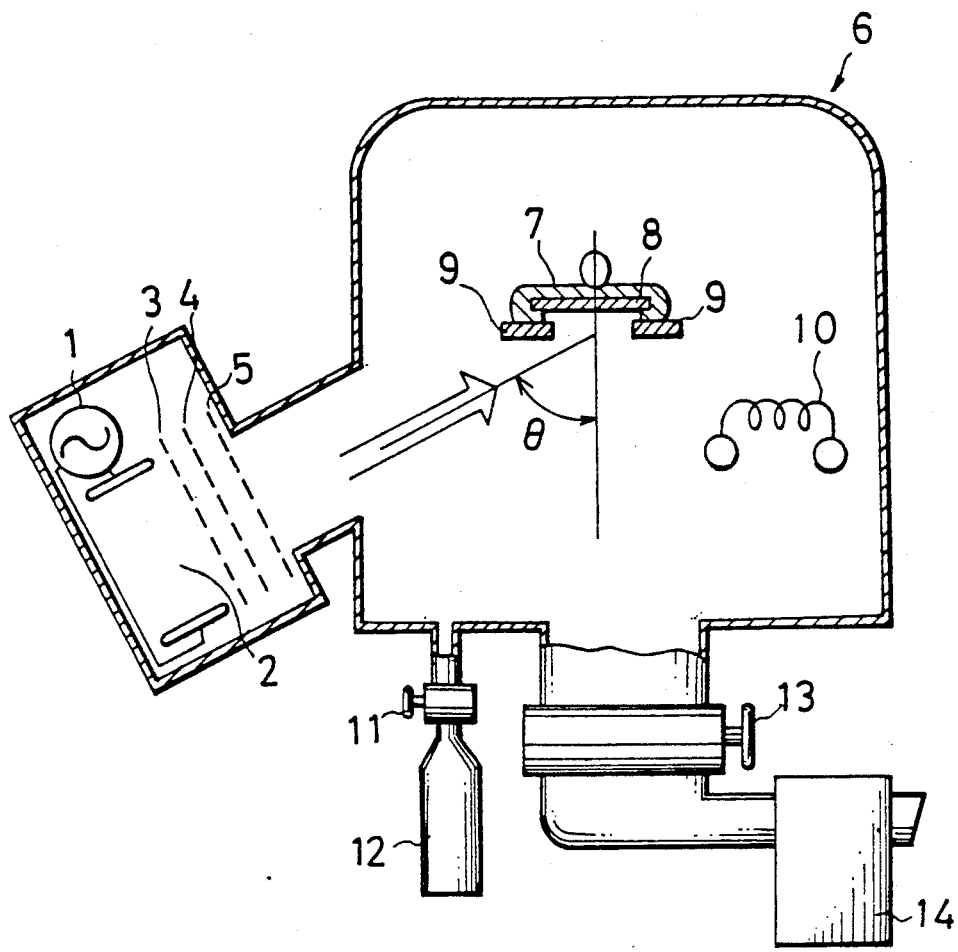
FIG. 2 is a model diagram showing an ion beam radiation device employed in a first embodiment of the invention.

At first, a polyimide film serving to orient the liquid-crystal molecules is formed on a glass plate on which a transparent electrode consisting of Indium Tin Oxide (ITO) is formed. If a silicon oxide film is employed as an orientation film, it may be formed by a vacuum evaporation method or a sputtering method, while the polyimide film can be formed by a dipping, spin-coat, offset printing or evaporating polymerization method. A preferable thickness of the polyimide film is about 30nm to 200nm. FIG. 2 shows a model diagram of an ion beam radiation device. Then, accelerated grains are obliquely radiated on the glass plate on which the polyimide film is formed by an ion beam radiation device having the structure as shown in FIG. 2. The ion beam radiation device includes a bell jar 6, an alternating current power source 1, a plasma generating unit 2 connected to the alternating current power source 1, a group of three electrodes, that is, an accelerating electrode 3, a pulling electrode 4 and an earth electrode 5 through which ions generated by the plasma generating unit 2 are passed, a plate fixing platform 7 located within the bell jar 6, a substrate 8 fixed on the plate fixing platform 7, a mask 9 covering the surroundings of the substrate 8, a neutralization filament 10, and gas flow rate control unit 11. The plasma generating unit 2 serves to generate and radiate ions on the substrate 8 through the group of three electrodes 3, 4 and 5. The gas flow rate control unit 11 is connected to a vacuum pump 14 through a conductive gas bomb 12 and a cock 13. The substrate 8 is made of a cell material such as glass, plastic or film and is fixed on the plate fixing platform 7 in a manner to keep an angle $\theta$ which is the angle of incidence of the accelerated grains with respect to a normal line of the substrate 8. The angle $\theta$ should be 40° to 80° and preferably 50° to 70°.

Figure 3:
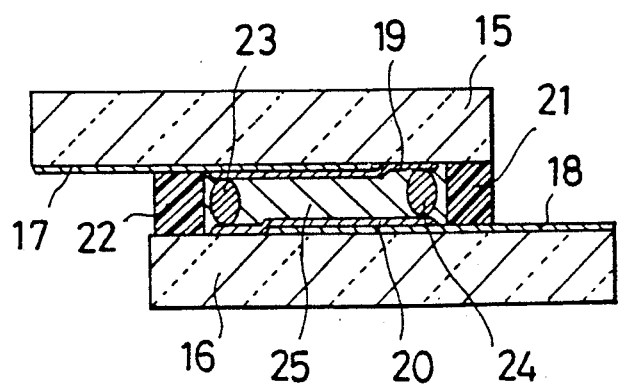
FIG. 3 is a view showing the structure of a liquid-crystal cell used for estimating the characteristic of an orientation film for liquid-crystal molecules obtained according to the first embodiment of the invention.

In operation, the vacuum pump 14 serves to vacuumize the bell jar 6 to an extent of $1 \times 10^{-5}$ torr to $2 \times 10^{-5}$ torr. Then, a gas such as argon, krypton, xenon or oxygen is introduced to the bell jar 6 through the gas flow rate control unit 11. The plasma generating unit 2 is operated at a pressure of $1 \times 10^{-4}$ torr to $10 \times 10^{-4}$ torr so that the introduced gas enters into a plasmatic state. The accelerating electrode 3, to which the voltage of about 250V to 2000 is applied, serves to apply kinetic energy to the ions appearing in the plasmatic state. The ion radiation to the polyimide film results in giving charges to the film because it serves as an insulating film. In order to cope with the charges, the neutralization filament 10 serves as emitting thermal electrons in a manner to neutralize the ions. This design allows an array of non-linear elements consisting of TFT or MIM to be used, because it does not generate such static electricity as breaking the non-linear elements. FIG. 3 shows the structure of a liquid-crystal cell used for estimating the characteristic of an orientation film for liquid-crystal molecules. As shown in FIG. 3, a twisted nematic liquid-crystal unit having a cell thickness of 5μm is produced using the substrate 8 which is formed described above. According to the present embodiment, the twisted nematic liquid-crystal unit includes glass plates 15, 16 served as a twisted nematic cell, transparent electrodes 17, 18 located in the glass plates 15, 16, orientation films 19, 20, sealing resins 21, 22, spacers 23, 24, and twisted nematic liquid-crystal 25.

FIG. 4 shows the characteristics of the liquid-crystal cell obtained by the present embodiment. In FIG. 4, argon gas is used as the introduce gas in obtaining the characteristics, which is similarly used in obtaining the characteristics shown in FIG. 1, the parameters for radiation condition are an angle (°) of incidence and a radiation time (sec), the estimated items are orientation evenness, a pre-tilt angle (°), a voltage retention (%), and a memory voltage (Voffset) caused when a direct current voltage is applied. The orientation evenness is defined by an area allowing for an even and horizontal orientation. The pre-tilt angle requires at least 0.5° or more. If the pre-tilt angle is too small, the liquid-crystal molecules are not twisted in a unidirectional manner when applying a voltage but is subject to a discrimination phenomenon. The voltage retention concerns with a display contrast given in time multiplexing so that as the voltage retention is made larger, the larger contrast is obtained. If the voltage retention has a value of 95% or some, a practicable contrast can be obtained. The memory voltage given when a direct current voltage is applied means an index against the display quality of an active matrix type liquid-crystal display device including an array of non-linear elements. That is, the index indicates how easily a flicker phenomenon is generated in applying a voltage with a asymmetric waveform to the liquid-crystal molecules. As the index is made smaller, the higher display quality can be obtained. The applied voltage is, herein, assumed to be defined for erasing flicker after 2V direct current voltage with a square waveform of ±3V and 30Hz is applied for 30 minutes. With the normal rubbing method, this voltage value should be 0.7V to 0.8V for a polyimide orientation film, about 2V for silicon oxide orientation film or about 2V for silicon-obliquely-evaporated film.

As shown in FIG. 4, the use of the liquid-crystal molecules orientation method designed according to the present embodiment makes it possible to obtain a quite high quality liquid-crystal display device employing either one of a simple matrix and an active matrix type as a display system.

And, when the orientation method for liquid-crystal molecules is applied to an active matrix type liquid-crystal display device designed to enhance TFT, no change of a TFT characteristic and disconnection or short-circuit of a bus line are found out after the radiation.

A second embodiment of the present invention is shown below.

According to this embodiment, the unidirectional and horizontal orientation treatment method includes the steps of evaporating an electrically-insulating and heat-resisting synthetic resin material monomer in a vacuum atmosphere, polymerizing the evaporated monomer on both electrode sides of a glass electrode plate, heating the evaporated film by heat or light radiation for raising an imido ratio in case of using the polyimide, radiating accelerated grains to a part or an overall surface of the synthetic resin film by an electric field.

Figure 5:
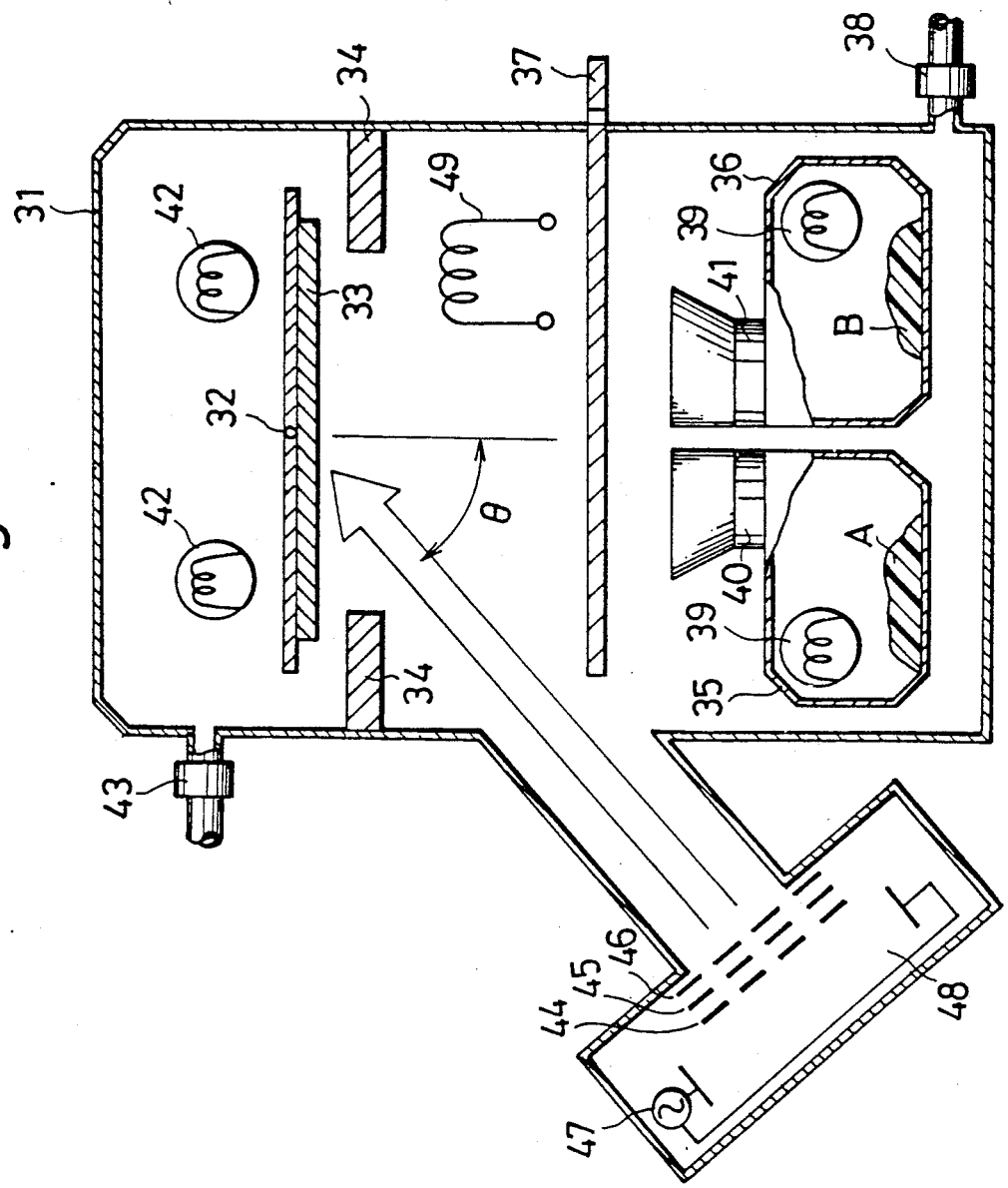
FIG. 5 is a model diagram showing an ion beam radiation device employed in a second embodiment of the invention.

FIG. 5 shows a model diagram of an ion beam radiation device employed in the present embodiment. The ion beam radiation device includes a treatment chamber 31, a plate fixing platform 32 provided in the treatment chamber 31, an electrode plate 33 having a semiconductor switching element, a mask 34 serving to screen the synthetic resin to be evaporated, material monomer vessels 35, 36, a shutter 37 for closing the vessels, flow rate adjusting valves 40, 41 for adjusting the evaporation amount, a heater 39 for heating the monomers, heaters 42 for heating the electrode plate 33, an accelerating electrode 44, a pulling electrode 45, an earth electrode 46, a high-frequency power source 47, a plasma generating unit 48, and a tungsten filament 49.

As shown in FIG. 5, the treatment chamber 31 includes the plate fixing platform 32 and the electrode plate 33 having a semiconductor switching element provided on the plate fixing platform 32. For defining a surface to be orientationtreated, the mask 34 serves to screen a synthetic resin to be evaporated. Next, pyromellitic dianhydride is put into the material monomer vessel 35 as a material monomer A and diaminodiphenyl ether is put into the material monomer vessel 36 as a material monomer B. The shutter 37 is closed for the vessels 35 and 36. Then, an exhausting valve 38 leading to an exhausting system is opened so that the atmosphere gas contained in the treatment chamber 31 is set to have the pressure of $1 \times 10^{-6}$ torr and the pyromellitic dianhydride served as the monomer A is heated to 160° C. and the diaminodiphenyl ether served as the monomer B is heated to 150° C. by the heater 39. These material monomers A and B are evaporated and the shutter 37 is opened when the evaporation amount is adjusted to have a mole ratio of 1 to 1 by the flow rate adjusting valves 40, 41. These monomers are evaporated on the side surface of the electrode plate 33 at an evaporating rate of 1Å/sec for about 11 minutes in order that the synthetic resin film is allowed to have a thickness of 650Å. When the film reaches a predetermined thickness, the flow rate adjusting valves 40, 41 and the shutter 37 are closed.

With the foregoing method, it is possible to uniformly form a polyamic acid film on the side of the electrode plate 33.

Next, the method follows the steps of heating the polyamic acid and the electrode plate 33 at 200° C. for 30 minutes by the heaters 42 for causing the polymerization reaction of polyimide and for raising an imido ratio, thereby forming a polyimide film on the side of the electrode. The preferable heaters 42 are thermal wires or halogen lamps radiating light.

In succession, the exhausting valve 38 leading to an exhausting system serves to adjust the total pressure of the atmosphere gas contained in the treatment chamber 31 to be $2 \times 10^-$ torr. Then, a gas feeding valve 43 leading to a gas feeding system serves to introduce an argon gas so that the pressure exerted in the treatment chamber 31 is adjusted as $5 \times 10^{-4}$ torr. Further, the gas feeding system is designed to introduce a desired gas such as argon, nitrogen, oxygen, hydrogen, helium or air.

Next, a voltage of 1000V is applied to the accelerating electrode 44 and a voltage of 500V is applied to the pulling electrode 45. The earth electrode 46 is located on the side of accelerating argon ions and the plasma generating unit 48 is operated to generate plasma by a high-frequency power source 47. The accelerating electrode 44 serves to apply kinetic energy to the ions pulled by the pulling electrode 45 for etching the film surface. The angle $\theta$ of incidence of an ion beam can be adjusted by varying an angle of the plate fixing platform 32. And, the polyimide film serving as an insulating film may contain charges, resulting in being unable to radiate an ion beam. For coping with this matter, the tungsten filament 49 is provided for emitting thermal electrons and neutralizing the insulating film.

The present embodiment employs a chemically stabilized argon gas. It uses an angle (°) of incidence of an ion beam and a radiation time (sec) as parameters for measuring orientation evenness, a pre-tilt angle (°) of liquid-crystal molecules, and a voltage retention (%) of the liquid-crystal. FIG. 6 shows the characteristics of a liquid-crystal cell obtained according to the present invention. It has been turned out that the angle of incidence of the ion beam should be, preferably, 40° to 80°, in particular, 50° to 80° for indicating excellent orientation of the liquid-crystal molecules.

As shown in FIG. 6, the present embodiment offers more even orientation than the normal method. The pre-tilt angle of the liquid-crystal molecules measured by a magnetic field potential method ranges from 0.4° to 1.0°. The embodiment offers a larger pre-tilt angle as the angle of incidence of the ion beam is made smaller and the radiation time is made shorter. Thus, it can control a pre-tilt angle which has been difficult to be controlled. The voltage retention of the liquid-crystal is relatively high regardless of the radiation condition of an ion beam.

Figure 7:
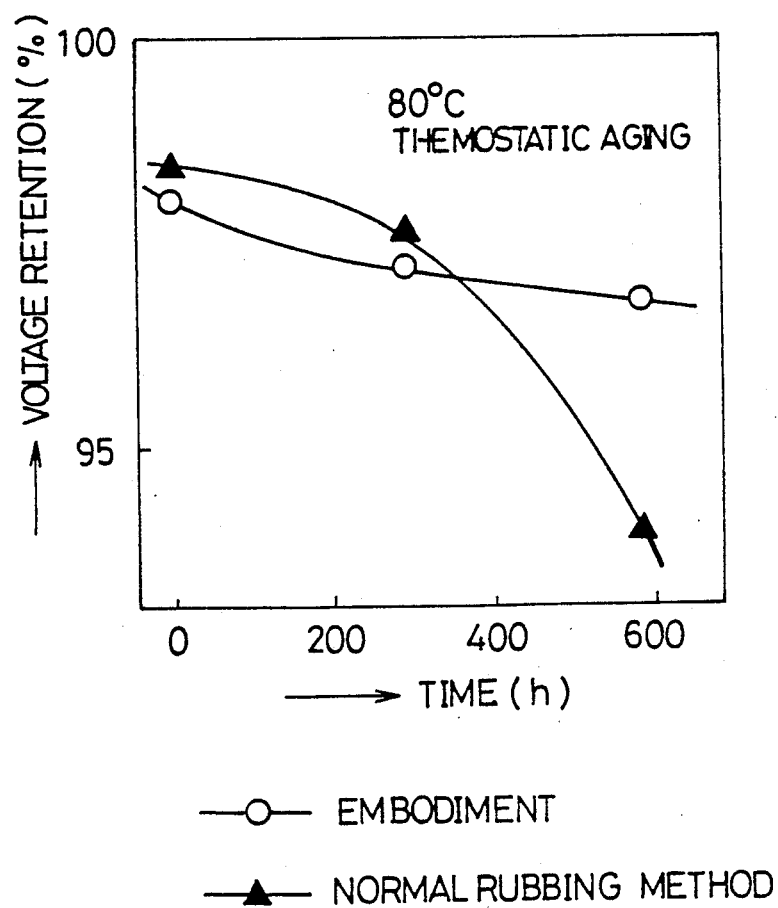
FIG. 7 is a graph showing the degradation of a voltage retention of the liquid-crystal cell obtained according to the second embodiment of the invention.

For checking the reliability, aging is performed in a state of applying a voltage in a 80° C. thermostatic chamber and it is measured that the voltage retention of the liquid-crystal is degraded in light of its characteristic. FIG. 7 shows the degradation of the voltage retention of the liquid-crystal obtained according to the present embodiment.

The graph shown in FIG. 7 indicates that the orientation treatment done by the present embodiment offers quite less degradation of voltage retention than the treatment done by the normal rubbing method.

The present embodiment can easily offer more even, horizontal and unidirectional orientation as well as less impurity and characteristic degradation than the normal orientation treatment. And, the manufacturing method is effective for the orientation treatment for a simple matrix type display device having no semiconductor switching element.

According to the foregoing embodiment, the series of orientation treatments can be carried out in vacuum and require no step of cleaning the treated surface, thereby reducing the overall steps and the cost. The embodiment is designed to evaporate the synthetic resin material monomer in vacuum, because the evaporated monomers are prevented from colliding each other or the evaporated monomer itself is prevented from collision against the wall on the treatment chamber and the monomer vapor is directly attached of the electrode plate on which it is polymerized. This method requires no solvent and can positively prevent impurities from being mingled for the purpose of sublimation process. The evaporating time is proportional to the thickness of a synthetic resin film, so that the embodiment can easily control the thickness of the film.

The preferable electrically-insulating and heat-resistant synthetic resins are polyimide, polyamide, polyurethane, and polyurea. Of these resins, the most superior one is polyimide in light of an electrically insulating characteristic, heat resistance, and electric-chemical stability as shown in the foregoing embodiment.

If the polymerized synthetic resin film is polyimide, it is necessary to heat the synthetic resin film for enhancing an imido ratio. In this case, thermal or light radiation enables the heating to be done in the vacuum treatment chamber. Further, if it is necessary to heat the material monomer for polymerization, the similar treatment can be applied.

The orientation treatment method has the steps of obliquely rushing the accelerated grains to a part or an overall surface of the synthetic resin film through the effect of the electric field, etching the film-coated surface, forming a minute ditch, and orienting the major axes of the liquid-crystal molecules along the ditch. The most preferable treatment is considered as a method related to the plasma etching such as ion beam etching. This treatment may be carried out in vacuum or inert gas. For obtaining relatively preferable orientation, the most preferable angle of incidence is in the range of 50° C. to 80° C. This treatment can easily offer more even and horizontal orientation and less impurity attached on the film-coated electrode plate than the normal treatment method. It results in offering high-quality unidirectional and horizontal orientation to an electrode plate, in particular, a large plate and a plate having the surface formed in a fine and complicated manner. In addition, the pre-tilt angle of the liquid-crystal molecules, which has been difficult to be controlled, are allowed to be adjusted by the angle of incidence of accelerated grains and the treatment time.

A third embodiment of the present invention is described below.

Figure 8:
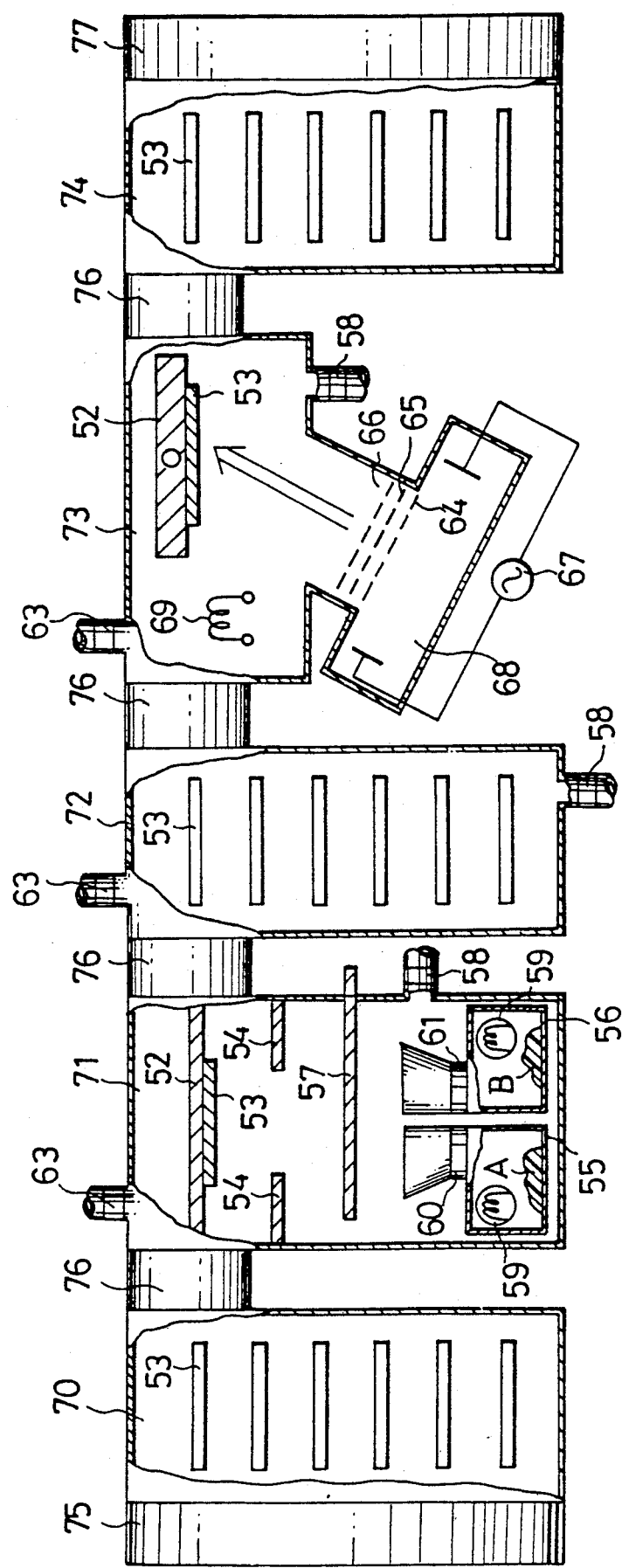
FIG. 8 is a model diagram showing an ion beam radiation device designed according to a third embodiment of the invention.

FIG. 8 illustrates an ion beam radiation device according to the present embodiment. As shown in FIG. 8, a plurality of electrode plates 53 are accommodated in a partition chamber 70. These electrode plates 53 are orientation-treated through a partition gate valve 75. Then, the electrode plates 53 are shifted into an evaporating chamber 71 one by one and one of the electrode plates 53 which is shifted is mounted to a plate fixing platform 52 in a manner to allow the electrode to be directed downwardly. A mask 54 serves to define a surface to be evaporated. Next, a material monomer A of pyromellitic dianhydride is put into the material monomer vessel 55 and a material monomer B of diaminodiphenyl ether is put into the material monomer vessel 56. Then, a shutter 57 is closed. An exhausting valve 58 leading to an exhausting system operates to adjust the pressure of an atmosphere gas contained in the evaporating chamber 71 to be $1 \times 10^{-6}$ torr. The monomer A is heated to 160° C. and evaporated and the monomer B is heated to 150° C. by a heater 59. When the evaporation amount is adjusted to have a mole ratio of 1 to 1 by flow rate adjusting valves 60, 61, the shutter 57 is opened. The monomers A and B are evaporated on the electrode side of the electrode plate 53 for about 11 minutes and at an evaporating rate of 1Å sec in a manner to allow the synthetic resin film to have a thickness of 650Å. After obtaining a predetermined thickness, the flow rate adjusting valves 60, 61 and the shutter 57 are closed. It has been turned out that this treatment method can form a film consisting of polyamic acid which has a uniform thickness on the electrode side of the electrode plate 53.

Next, for polymerizing the polyimide by heating the polyamic acid and enhancing an imido ratio, the electrode plates 53 are serially transferred to a heating chamber 72 in which the electrode plate 53 is heated at 200° C. for 30 minutes for forming a polyimide film on the electrode side. An exhausting valve 58 leading to an exhausting system is required to adjust the gas pressure of the heating chamber 72 to the same value of $1 \times 10^{-6}$ torr as the evaporating chamber 71, because it is necessary to keep the overall treatment steps clean and the pressure exerted in the evaporating chamber 71 constant.

Then, the electrode plate 53 is transferred to an orientation treatment chamber 73 in which it is fixed in a plate fixing platform 52. The exhausting valve 58 serves to adjust the pressure of the atmosphere gas exerted on the orientation treatment chamber 73 to be the value of $2 \times 10^{-5}$ torr. Next, a gas feeding valve 63 leading to a gas feeding system serves to introduce an argon gas to the orientation treatment chamber 73 for keeping the pressure of the chamber at $5 \times 10^{-4}$ torr. Like the foregoing second embodiment, an ion beam is generated for etching the film-coated surface of the electrode plate 53. When the orientation treatment finishes, the electrode plate 53 is transferred to a drawing chamber 74 in which the electrode plates 53 are accommodated and are picked out through a gate valve 77 when the number of electrode plates which is accommodated in the drawing chamber 74 reach a predetermined number. It has been turned out that the present embodiment can provide high-quality, unidirectional and horizontal orientation to the liquid-crystal molecules.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of forming an orientation film of a liquid-crystal display device having two electrode plates and a liquid-crystal cell between said two electrode plates, said liquid-crystal cell having liquid-crystal molecules, comprising the steps of:
   forming an organic film on a partial or overall surface of at least one plate of said two electrode plates; and
   radiating accelerated ions containing neutral atoms to said partial or overall surface of said organic film coated on said plate for etching said organic film and orienting said liquid-crystal molecules in a unidirectional manner;
   whereby an angle of incidence of said accelerated ions is defined as 40° to 80° with respect to a normal line of said plate.

2. A method as claimed in claim 1, wherein said organic film consists of polyimide, polyamide, polyurethane, or polyurea.

3. A method as claimed in claim 1, wherein said plate consists of Indium Tin Oxide.

4. A method of forming an orientation film of a liquid-crystal display device having two electrode plates and a liquid-crystal cell between said two electrode plates, said liquid-crystal cell having liquid-crystal molecules, comprising the steps of:

forming a polyimide film on partial or overall surface of at least one plate of said two electrode plates; and radiating accelerated ions containing neutral atoms to said partial or overall surface of said polyimide film coated on said plate for etching said polyimide film and orienting said liquid-crystal molecules in a unidirectional manner, whereby an angle of incidence of said accelerated ions is defined as 40° to 80° with respect to a normal line of said plate.

5. A method as claimed in claim 4, wherein said polyimide film is formed to have a thickness of about 30nm to 200nm.

6. A method as claimed in claim 4, wherein said angle of incidence of said accelerated ions is defined as 50° to 70° with respect to said normal line of said plate.

7. A method as claimed in claim 4, wherein formation of said polyimide film is done by a dipping, spin-coat, offset printing, or evaporating polymerization method.

8. A method of forming an orientation film of a liquid-crystal display device having two electrode plates and a liquid-crystal cell between said two electrode plates, said liquid-crystal cell having liquid-crystal molecules, comprising the steps of:

forming a polymer film which is deposited by evaporating polymerization method on a partial or overall surface of at least one plate of said two electrode plates; and radiating accelerated ions containing neutral atoms to said partial or overall surface of said polymer film coated on said plate for etching said polymer film and orienting said liquid-crystal molecules in a unidirectional manner, whereby an angle of incidence of said accelerated ions is defined as 40° to 80° with respect to a normal line of said plate.

9. A method as claimed in claim 8, wherein said angle of incidence of said accelerated ions is defined as 50° to 80° with respect to said normal line of said plate.

10. A method as claimed in claim 8, wherein said polymer film consists of pyromellitic dianhydride and diaminodiphenyl ether.

11. A method as claimed in claim 8, wherein formation of said polymer film is done by an evaporation method.

* * * * *